United States Patent [19]
Colombo et al.

[11] Patent Number: 5,800,018
[45] Date of Patent: Sep. 1, 1998

[54] NONSLIP TRAVEL PILLOW

[76] Inventors: John P Colombo; Margaret A Colombo, both of 7769 Dryer Rd., Victor, N.Y. 14564

[21] Appl. No.: 763,097

[22] Filed: Dec. 7, 1996

Related U.S. Application Data

[60] Provisional application No. 60/009,505 Dec. 30, 1995.

[51] Int. Cl.$^6$ ............................................. A47C 1/10
[52] U.S. Cl. .................................. 297/395; 297/391
[58] Field of Search .......................... 297/391, 395, 297/397, 220, DIG. 6, DIG. 1, 188.01; 5/636

[56] References Cited

U.S. PATENT DOCUMENTS

| | | |
|---|---|---|
| 2,167,178 | 7/1939 | Kohlstadt . |
| 3,129,975 | 4/1964 | Emery .................................. 297/397 |
| 4,114,948 | 9/1978 | Perkey .................................. 297/397 |
| 4,521,470 | 6/1985 | Overbergh et al. . |
| 4,607,886 | 8/1986 | Mazhar .............................. 297/395 X |
| 4,702,519 | 10/1987 | Lobanoff ....................... 297/188.01 X |
| 4,919,483 | 4/1990 | Horkey .................................. 297/395 |
| 4,951,998 | 8/1990 | McClain ................................ 297/395 |
| 4,985,950 | 1/1991 | Gladish .............................. 297/395 X |
| 5,140,713 | 8/1992 | Pesterfield . |
| 5,317,772 | 6/1994 | Perl et al. ............................. 5/636 X |
| 5,322,349 | 6/1994 | Gianino ......................... 297/DIG. 6 X |

*Primary Examiner*—Milton Nelson, Jr.

[57] ABSTRACT

A pillow is attachable to the window of an automobile or other vehicle via one or more suction cups. The pillow comprises a cushion portion consisting of foam rubber or other soft, resilient material, a fabric cover for the cushion that may be removable, a vertical back portion to which one or more suction cups are attached and which comprises a nonskid material on the side that faces the vehicle window to minimize vertical and horizontal slippage of the pillow when in use.

14 Claims, 4 Drawing Sheets

NONSLIP TRAVEL PILLOW

This application claims the benefit of U.S. Provisional application Ser. No. 60/009,505 filed Dec. 30, 1995.

BACKGROUND OF THE INVENTION

This invention relates to a nonslip travel pillow that may be attached via one or more suction cups to the window of a vehicle such as an automobile to enable a passenger seated by a window to rest his or her head while riding.

It is not unusual for a passenger to rest his or her head against a window while riding, often in attempting to sleep. To do this without a pillow is uncomfortable and can be dangerous. Unattached pillows tend to slip down the glass surface and may even dislodge. Pillows that attach to smooth surfaces via suction cups have been disclosed in U.S. Pat. Nos. 4,731,891 and 5,140,713. These were designed as bath pillows and are not particularly suited to vehicular use. U.S Pat. No. 3,220,770 discloses an automobile headrest that attaches between the automobile window and frame. U.S. Pat. Nos. 2,167,178, 4,951,998, 4,985,950 and 5,317,772 all disclose pillows that are attachable to smooth surfaces via suction cups and that may be suitable for vehicular use. However, none of these pillows offers the combination of resistance to slippage and simplicity of construction that is provided by the nonslip travel pillow of our invention.

SUMMARY OF THE INVENTION

The present invention relates to a nonslip travel pillow that is attachable to the window of an automobile or other vehicle via one or more suction cups. The pillow comprises a cushion portion consisting of foam rubber or other soft, resilient material, a fabric cover for said cushion that may be removable, a vertical back portion to which one or more suction cups are attached and which comprises a nonskid material to minimize vertical and horizontal slippage of the pillow when in use.

The primary advantage of the present invention is that it provides a travel pillow with reduced tendency to slip or shift in response to vehicular motion during use. Another advantage of the present invention is that it provides a travel pillow of simple and inexpensive construction. An additional object of this invention is to provide a travel pillow that serves as a sun shield. Further objects of this invention are to provide a comfortable and durable travel pillow.

BRIEF DESCRIPTION OF THE DRAWINGS

The features of the travel pillow of this invention are illustrated in the drawings of FIGS. 1 through 4. A side view of the travel pillow of this invention is provided in FIG. 1.

DETAILED DESCRIPTION OF THE DRAWINGS AND PREFERRED EMBODIMENT

Figure 1:
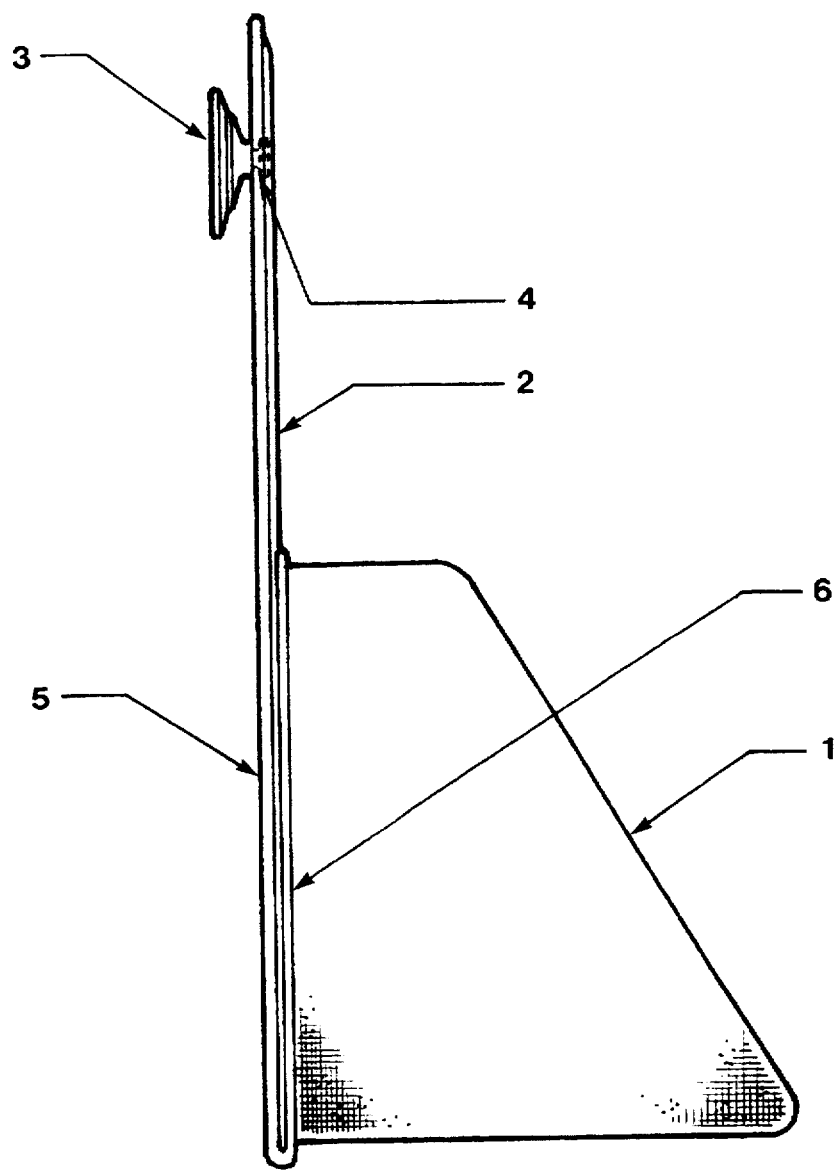

The features of the travel pillow of this invention are illustrated in the side view given in FIG. 1. The travel pillow of this invention comprises a cushion portion (1) containing foam rubber or other soft, resilient material and covered with a fabric. The travel pillow of this invention, as illustrated in FIG. 1, further comprises a vertical back portion (2) to which said cushion is attached, and which comprises a separate nonslip backing material (5) on the side that faces a vehicle window. The travel pillow of this invention further comprises one or more suction cups (3) attached to said back portion, and which serve to affix the travel pillow to the window of a vehicle.

The cushion portion of the travel pillow of this invention may contain any soft, resilient material suitable for providing a a head rest. Foam rubber type materials are suitable, and polyurethane foam is particularly contemplated. Mixtures of open- and closed-cell foams or of high- and low-density foams may be utilized for said cushion. Alternative soft materials including air bladders and feather pillows may also be used for the cushion. The cushion may have any shape consistent with comfort.

In a preferred embodiment the fabric cover for said cushion may be removed by unfastening along seems (6). The removable cover allows the cushion to be replaced and facilitates cleaning of the cover. The removable fabric cover maybe attached to the back portion (2) of the pillow by a variety of means, including zippers or snaps. In a preferred embodiment of this invention the removable fabric cover is attached via VELCRO strips, wherein VELCRO represents a hook-and-loop fastener. A variety of fabrics may be used for said fabric cover. Brushed polyester is particularly contemplated for the fabric cover as well as for the back portion (2) of the travel pillow of this invention. Preferably said fabric cover comprises a washable material. The fabric may also be decorated with artwork or messages.

The back portion (2) of the travel pillow of this invention may be constructed of any suitable fabric. The fabric utilized for said back portion (2) may be the same as the fabric used for the fabric cover, such as brushed polyester. The fabric part of the back portion faces the passenger. The nonslip backing (5) is attached to the side of the back portion (2) that faces the vehicle window. The nonslip backing is included in the area of the pillow directly behind the cushion. The nonslip backing minimizes roll and slippage of the travel pillow during use and also reduces the stress at the point(s) of attachment of the suction cup(s) (3) to the back portion (2) of the travel pillow. The nonslip backing may be constructed of any of a variety of nonslip or nonskid materials known in the art, including MAGIC-GRIP and SCOOT-GUARD. OFFICE LINER mesh made by MANCO is particularly contemplated as a nonslip backing (5) for the travel pillow of this invention.

One or more suction cups (3) serve to affix the travel pillow of this invention to a vehicle window. Said suction cups (3) may be attached to the back portion (2) of the travel pillow of this invention in a variety of means. For example, the suction cups may be sewn onto the fabric of the portion of the travel pillow. The back portion (2) may comprise two layers of fabric between which the heads of the suction cups are attached. Preferably the suction cup(s) (3) are attached to the back portion (2) of the travel pillow of this invention via grommets (4), as shown in FIG. 1.

The suction cups (3) of the travel pillow of this invention may be made of a variety of materials, with polyvinyl chloride suction cups being specifically contemplated. Said suction cups (3) may have a tab, as illustrated in FIG. 2, to facilitate removal from a vehicle window.

Figure 2:
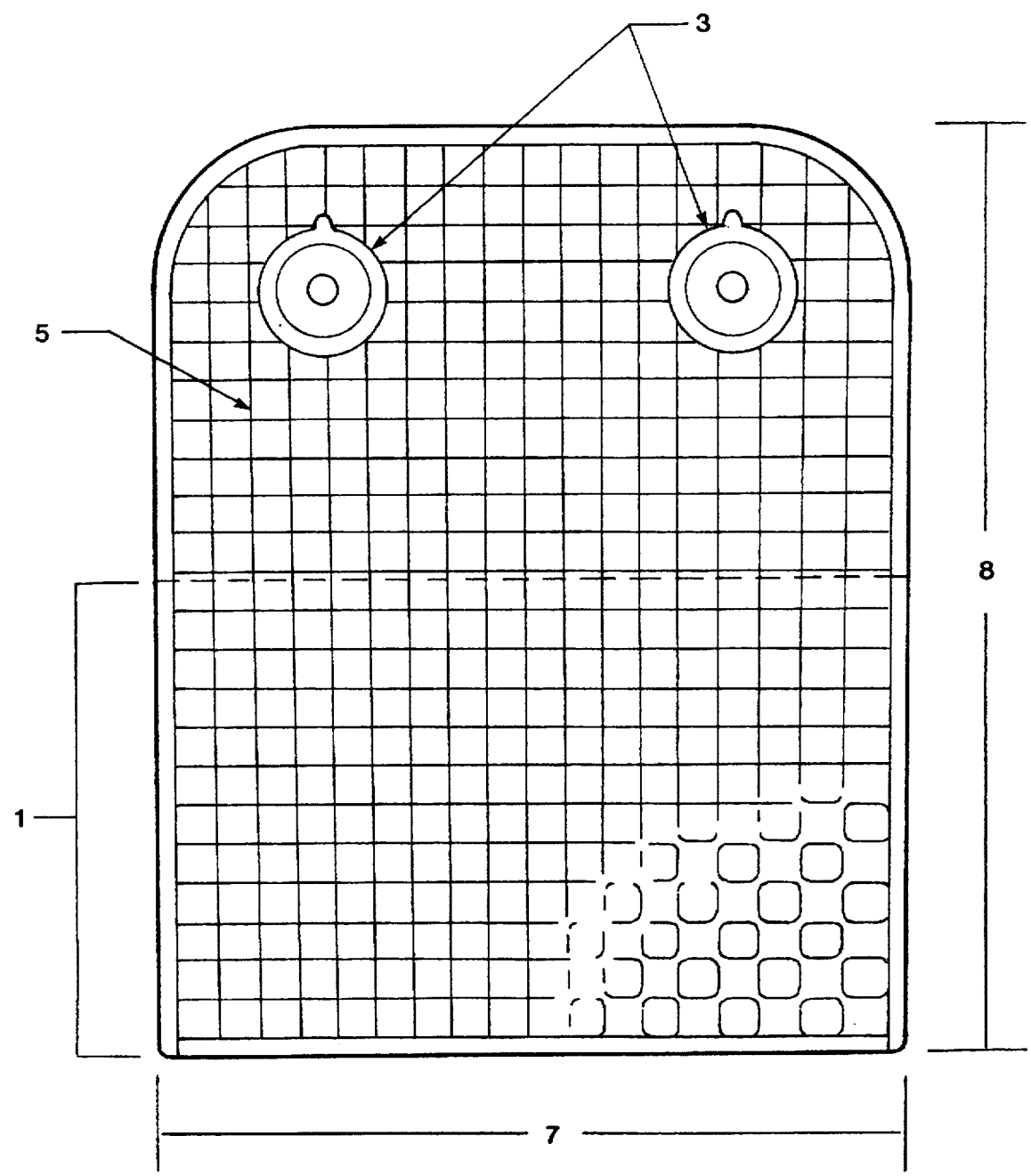
FIG. 2. provides a view of one embodiment of the travel pillow of this invention from the back side i.e. the side that attaches to the vehicle window. Back views of two alternative embodiments of the travel pillow of this invention are illustrated FIG. 3.

A back view of one embodiment of the travel pillow of this invention is given in FIG. 2. This embodiment utilizes two suction cups (3). The cushion (1), not shown in this view, occupies the area below the dotted line in FIG. 2. The nonslip mesh (5) occupies the entire back of the travel pillow in this embodiment. The width (7) and length (8) of the travel pillow of this invention may vary over a range that provides comfort and convenience. Typically, width (7) will be in the range of 10 to 12 inches, and length (8) will be in the range of 12 to 15 inches.

The travel pillow of this invention may also serve as a sun shield when attached to a vehicle window. The nonslip backing (5) of the travel pillow may contain UV absorbers and stabilizers to minimize degradation upon exposure to sunlight. A removable cloth may be used to cover the nonslip backing material of the travel pillow when not in use.

Figure 3A:
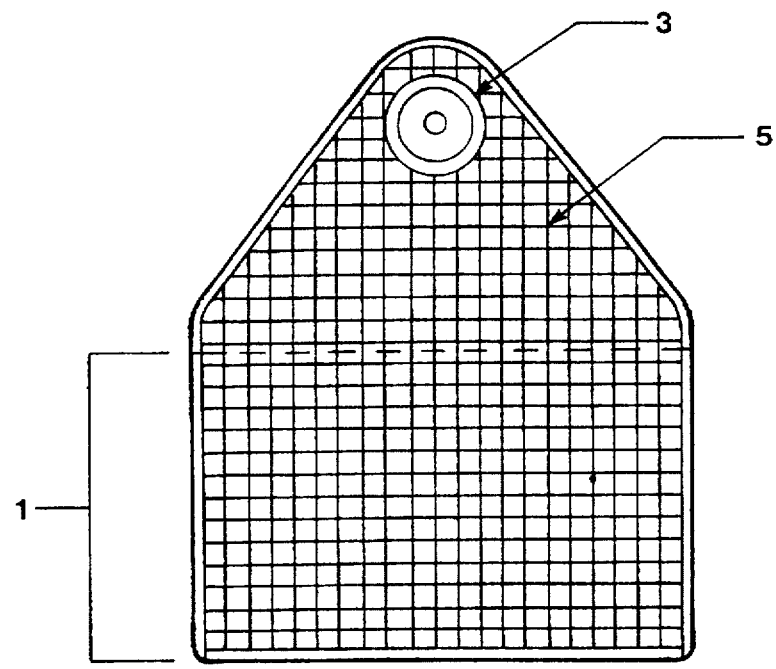

Alternative back views of the travel pillow of this invention are provided in FIG. 3. For the embodiment in FIG. 3A a single suction cup (3) is utilized. The nonslip backing (5) renders this embodiment more practical, since said backing helps arrest the downward and sideward thrust against the suction cup, thereby exerting less stress at the point of attachment. The more force that is applied against said backing the less tendency for slippage.

Figure 3B:
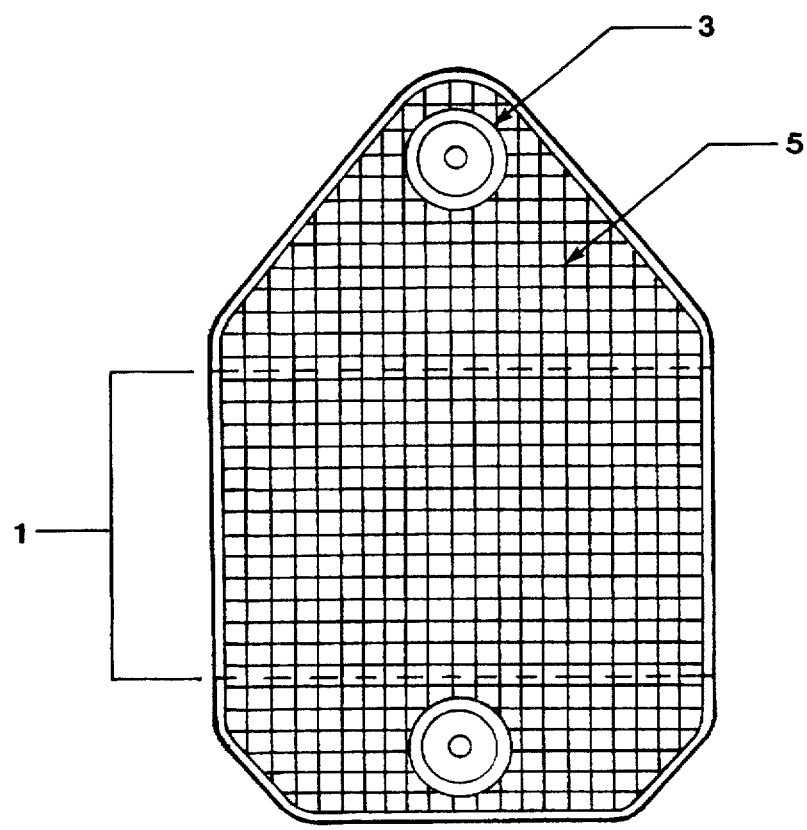

The embodiment of the travel pillow of this invention illustrated by the back view in FIG. 3B is particularly useful on a more highly-curved window surface. The lower suction cup (3) fixes the lower portion of the travel pillow against the window to reduce motion during use.

Figure 4:
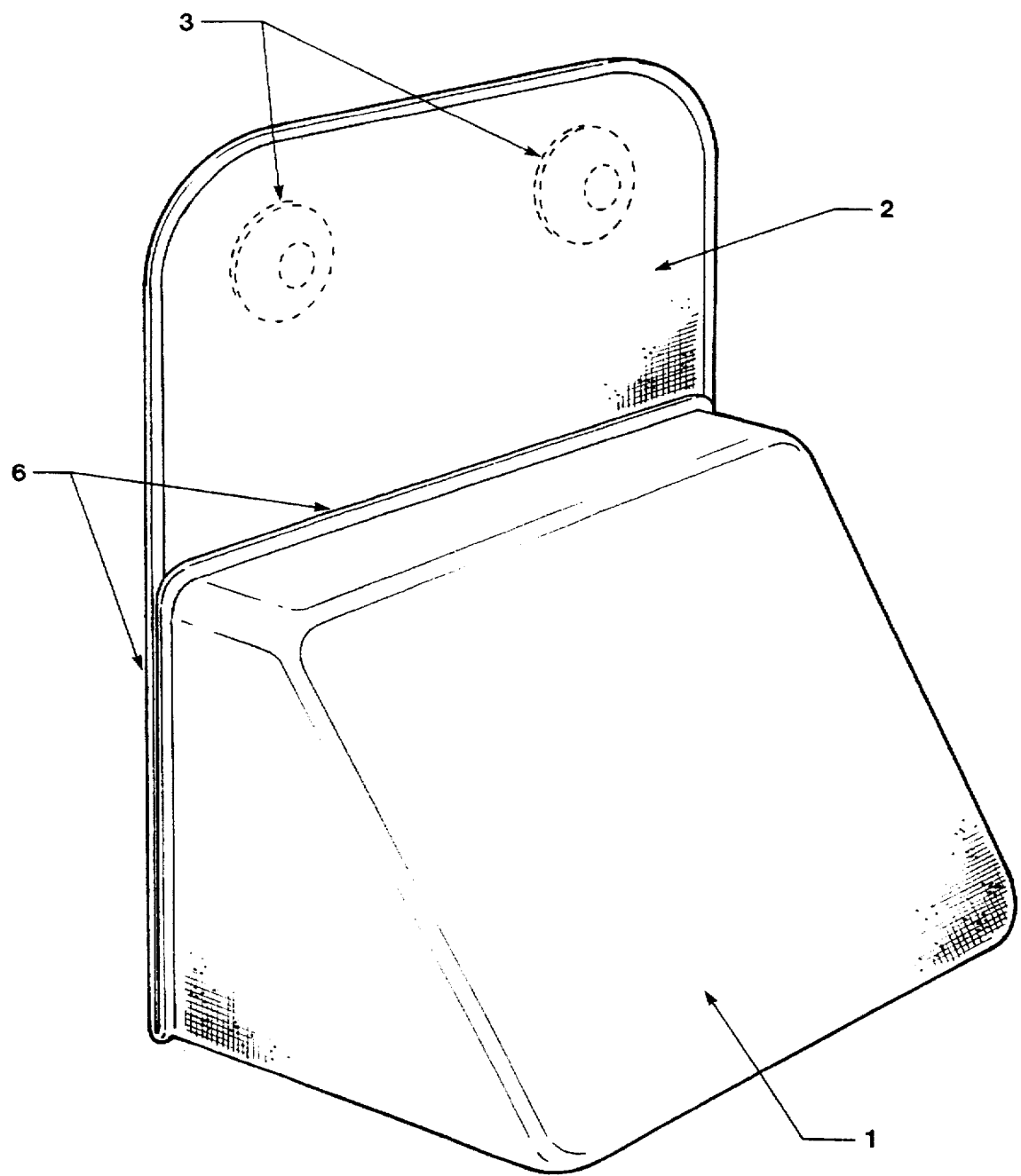
FIG. 4 is a front perspective view of our travel pillow.

A front perspective view of the travel pillow of this invention is provided in FIG. 4. In this embodiment the cushion (1) is shown without a depression or indentation in the central portion. However, the foam or filler material of said cushion might also be of such a shape to provide a depression in the center of the pillow to reduce the tendency of a users head to roll in response to vehicular motion. The cushion (1) might also contain a small storage compartment, which could be accessed by unfastening the fabric cover along the seems (6). In the embodiment of FIG. 4., portions of the suction cups (3) are shown protruding through the back portion (2) as might occur when grommets are used. Alternatively, the part of the suction cups that allow attachment to the back portion of the pillow may be covered by the fabric comprising said back portion.

An embodiment of the travel pillow of this invention similar to the embodiment illustrated by FIGS. 1, 2 and 4 is now being sold commercially under the name Comfi-Rider. The Comfi-Rider uses a polyurethane foam cushion with a removable plush fabric cover attached to the back portion of the pillow via VELCRO strips.

The preceding examples are set forth to illustrate specific embodiments of the nonslip travel pillow of this invention and are not intended to limit the scope of the invention.

Additional embodiments and advantages within the scope of the present invention will be apparent to one skilled in the art.

What is claimed is:

1. A nonslip travel pillow, comprising (a) a soft, resilient cushion against which a passenger may rest his or her head; (b) a fabric cover for said cushion; (c) a vertical back portion that rests against a window of a vehicle and to which said fabric cover and said cushion are attached; (d) at least one suction cup, which is attached to the back portion of said pillow to affix said pillow to a window of a vehicle; and (e) a separate nonslip backing material attached to the window side of said back portion of said travel pillow to minimize motion and reduce stress on said suction cups during use, such that the area of the pillow directly behind said cushion includes said nonslip backing.

2. A nonslip travel pillow according to claim 1, wherein said cushion comprises polyurethane foam.

3. A nonslip travel pillow according to claim 1, wherein the central portion of said cushion has a depression.

4. A nonslip travel pillow according to claim 1, wherein the suction cups are attached to the back portion of said pillow via grommets.

5. A nonslip travel pillow according to claim 1, wherein the fabric cover is washable.

6. A nonslip travel pillow according to claim 1, wherein the fabric cover is brushed polyester.

7. A nonslip travel pillow according to claim 1, wherein the suction cups comprise polyvinyl chloride.

8. A nonslip travel pillow according to claim 1, wherein said suction cup has a tab to facilitate removal from a window of a vehicle.

9. A nonslip travel pillow according to claim 1, wherein the cushion contains a small storage compartment.

10. A nonslip travel pillow according to claim 1, wherein the fabric cover is removable.

11. A nonslip travel pillow according to claim 10, wherein the removable fabric cover is attached via a hook and loop fastener.

12. A nonslip travel pillow according to claim 1, wherein two suction cups are used to secure said pillow to a window of a vehicle.

13. A nonslip travel pillow according to claim 12, wherein both suction cups are located near the top of said pillow.

14. A nonslip travel pillow according to claim 12, wherein one suction cup is located near the top of said pillow and the other suction cup is at the bottom of said pillow to facilitate attachment to windows with substantial curvature.

* * * * *